J. A. SHARP.
FRAME ADJUSTING MECHANISM FOR SIDE DELIVERY RAKES.
APPLICATION FILED MAY 27, 1911.
1,019,849.
Patented Mar. 12, 1912.
2 SHEETS—SHEET 1.
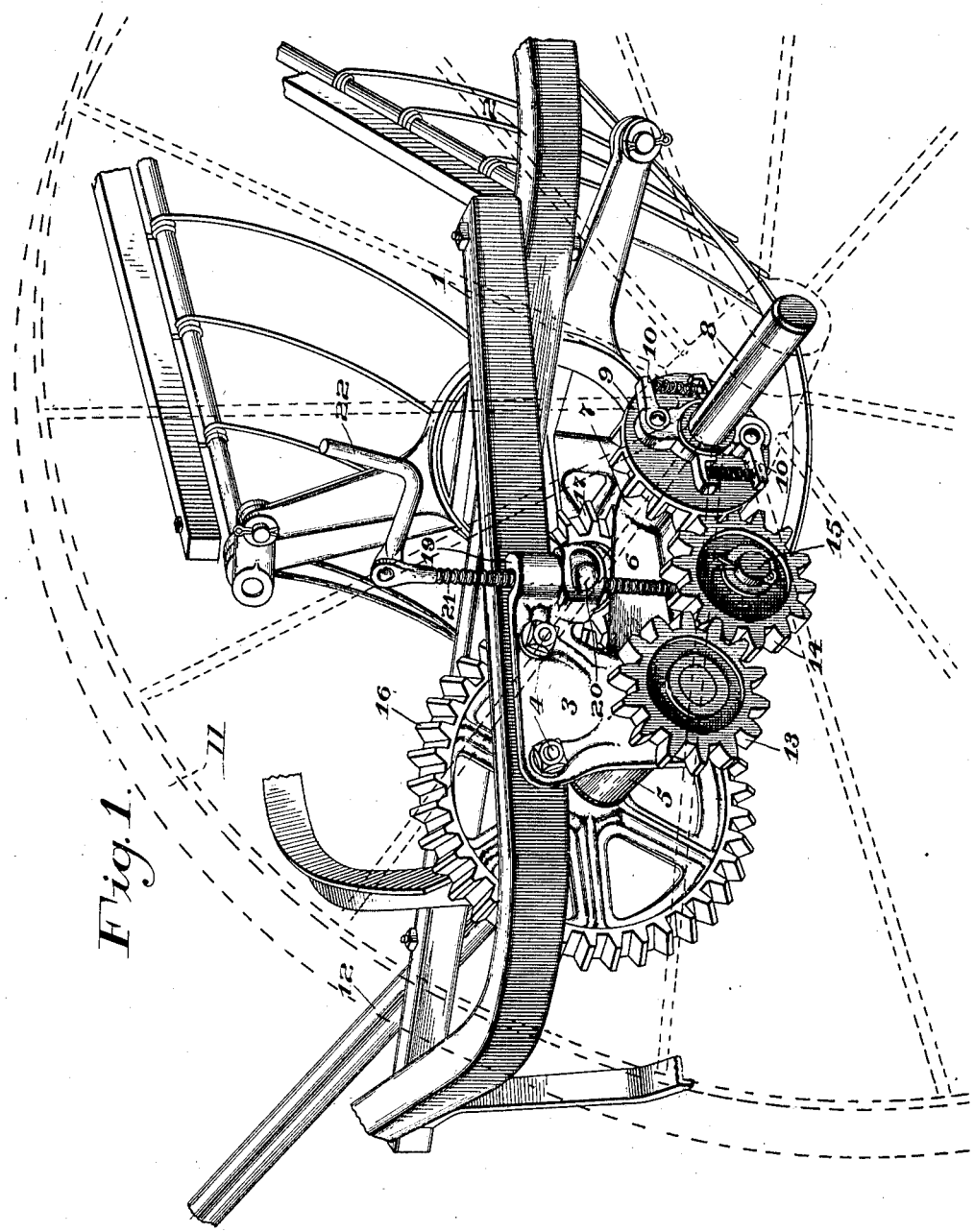
Witnesses:
C. C. Palmer.
F. W. Hoffmeister.
Inventor.
James A. Sharp.
By E. W. Burgess
Attorney.

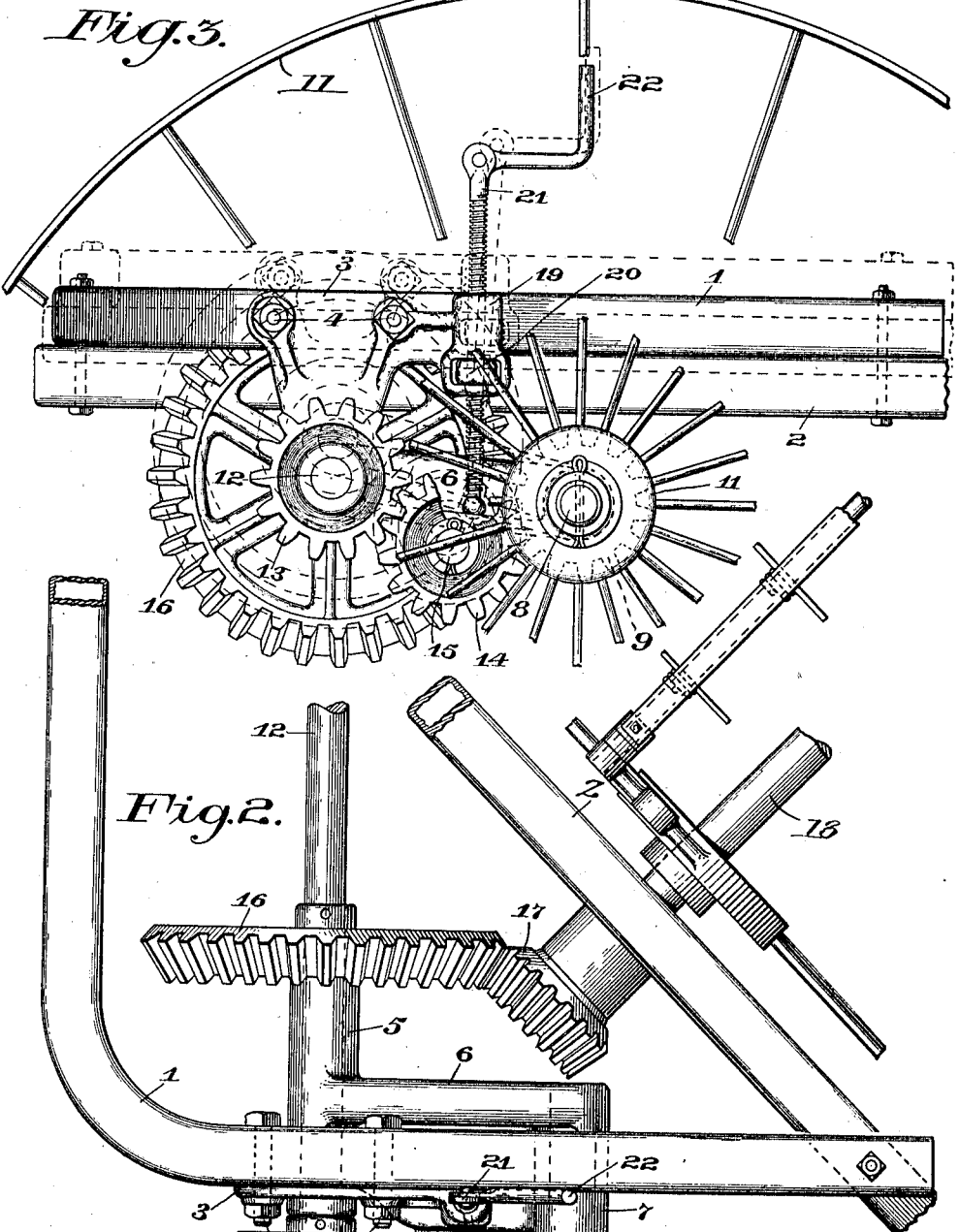

UNITED STATES PATENT OFFICE.

JAMES A. SHARP, OF SPRINGFIELD, OHIO, ASSIGNOR TO INTERNATIONAL HARVESTER COMPANY, A CORPORATION OF NEW JERSEY.

FRAME-ADJUSTING MECHANISM FOR SIDE-DELIVERY RAKES.

1,019,849.  Specification of Letters Patent.  Patented Mar. 12, 1912.

Application filed May 27, 1911. Serial No. 629,902.

*To all whom it may concern:*

Be it known that I, JAMES A. SHARP, a citizen of the United States, residing at Springfield, in the county of Clark and State of Ohio, have invented certain new and useful Improvements in Frame-Adjusting Mechanism for Side-Delivery Rakes, of which the following is a specification.

My invention relates to side delivery hay rakes, and in particular to mechanism whereby the frame carrying the raking means may be adjusted to a higher or lower plane relative to the axis of the carrying wheels in a manner to cause the raking means to operate at varying distances from the ground; the object of my invention being to provide a mechanism that may be readily and easily manipulated for the desired purpose, simple and strong in its construction, and efficient in operation. I attain these objects by means of the mechanism illustrated by the accompanying drawings, in which—

Figure 1 represents a perspective view of part of a rake carrying frame and rake driving mechanism having my improved frame adjusting means forming a part thereof; Fig. 2 represents a top plan view of Fig. 1; and Fig. 3 is a side elevation of Fig. 2, including a portion of one of the carrying wheels.

The same reference characters designate like parts throughout the several views.

1 represents a portion of a U-shaped rake carrying frame member and 2 a part of a supplemental frame member forming part of the structure; 3 represents a depending bracket member secured to frame member 1 by means of bolts 4 and having at its lower end an opening that loosely receives one end of a sleeve 5 that forms part of a swinging yoke 6 that is provided at its rear end with a sleeve portion 7, in which is secured a stub axle 8 having a driving pinion 9 loosely mounted thereon and provided with a common form of spring-pressed driving pawl mechanism 10 that is adapted to operatively engage with a wheel hub provided with ratchet teeth in a manner to rotate the pinion in a forward direction only, as is usual in the class of machines indicated, and 11 represents one of the carrying wheels. The sleeve 5 receives one end of an axle 12 that is journaled therein, a part only of the axle being shown, and the opposite end thereof may be journaled in any of the well known ways at the opposite side of the rake frame structure, the axle deriving motion from the driving pinion 9 by means of a pinion 13 secured to the axle and an intermediate pinion 14 journaled upon a stud 15 carried by the swinging yoke 6. 16 represents a gear wheel secured to the axle 12 at the opposite end of sleeve 5 said gear wheel 16 being adapted to engage with a pinion 17 secured to one end of a rake cylinder driving shaft 18 that is journaled in bearings carried by the rake frame, said shaft 18 being all that is necessary to illustrate this part of my invention as applied to the class of machines indicated, and any of the common forms of gear shipping mechanism may be employed to cause the two gears to be either operative or inoperative. Integral with bracket member 3 is a box portion 19 that receives a nut 20, and 21 represents a vertically arranged threaded rod that is received by openings in the bracket member and engages with the nut, the lower end of the rod contacting with the swinging yoke 6 in a manner to cause said yoke to turn about its axis, and 22 represents a folding crank pivotally connected with the upper end of the rod whereby it may be turned in either direction.

The carrying wheel supports the main frame by means of the yoke 6, and for the purpose of adjusting said frame to a higher or lower plane relative to the axis of the carrying wheel, the threaded rod 21 is turned in the desired direction by means of the crank 22. When the rod is turned in a direction to cause it to move downward through the nut, it will cause the yoke to swing downward relative to the frame and the latter to rise to a higher plane relative to the axis of the carrying wheel, and when turned in an opposite direction the yoke will swing in a direction permitting the frame to fall to a lower plane.

What I claim as being my invention, and desire to secure by Letters Patent, is:

1. A side delivery hay rake including, in combination, a main frame having raking mechanism mounted thereon, means for transmitting motion to said raking mechanism, said means including a rotatable axle mounted in bearings carried by said frame, one of said bearings including a rearwardly extending swinging yoke having a stub axle at the rear end thereof, a carrying wheel journaled upon said stub axle and adapted to transmit motion to said rotatable axle, and means operative to swing said yoke about the axis thereof in a manner to raise or lower said main frame relative to the axis of said carrying wheel.

2. A side delivery hay rake including, in combination, a main frame having raking mechanism mounted thereon, means for transmitting motion to said raking mechanism, said means including a rotatable axle mounted in bearings carried by said main frame, one of said bearings including a rearwardly extending swinging yoke having a stub axle secured to the rear end thereof, a carrying wheel journaled upon said stub axle, and means whereby motion is transmitted from said carrying wheel to said rotatable axle, said means including a pinion loosely mounted upon said stub axle and provided with clutch mechanism adapted to engage with said carrying wheel, a pinion secured to said rotatable axle, an intermediate pinion mounted upon a stud carried by said yoke member and engaging with said first named pinions, and means operative to swing said yoke about the axis thereof in a manner to raise or lower said main frame relative to the axis of said carrying wheel.

3. A side delivery hay rake including, in combination, a main frame having raking mechanism mounted thereon, means for transmitting motion to said raking mechanism, said means including a rotatable axle mounted in bearings carried by said main frame, a rearwardly extending yoke adapted to rock about the axis of said rotatable axle, a stub axle secured to the rear end of said yoke, a carrying wheel journaled upon said stub axle and adapted to transmit motion to said rotatable axle, means adapted to swing said yoke about the axis thereof, said means including a vertically arranged threaded rod engaging with a nut carried by a fixed part of the machine, the lower end of said rod contacting with said yoke in a manner to rock it in a direction to raise said main frame or permit it to rock in an opposite direction to lower said main frame relative to the axis of said carrying wheel, depending upon the direction of rotation of said rod, and means for turning said rod.

4. A side delivery hay rake including, in combination, a main frame having raking mechanism mounted thereon, a bracket secured to said main frame, a rocking yoke having a sleeve portion at one end thereof, said sleeve being loosely received by an opening in said bracket, a motion transmitting shaft journaled in said sleeve, a stub axle secured to the opposite end of said yoke, a carrying wheel journaled upon said stub axle, means for rocking said yoke in a manner to adjust said main frame to a higher or lower plane relative to the axis of said carrying wheel, said means including a nut carried by said bracket and a threaded rod engaging with said nut, having a crank at its upper end and its lower end contacting with said yoke.

JAMES A. SHARP.

Witnesses:
W. B. KENDIG,
JAS. B. FOREMAN.

---

Copies of this patent may be obtained for five cents each, by addressing the "Commissioner of Patents, Washington, D. C."